United States Patent [19]
Weinstein

[11] 3,801,917
[45] Apr. 2, 1974

[54] TIME INTERVAL MEMORY DEVICE

[75] Inventor: Arnold Weinstein, Flushing, N.Y.

[73] Assignee: The United States of America as represented by the Secretary of the Navy, Washington, D.C.

[22] Filed: Mar. 22, 1965

[21] Appl. No.: 442,237

[52] U.S. Cl. .................... 328/129, 307/269, 328/63, 343/13 R, 235/92 T, 324/186
[51] Int. Cl. .......................... G01r 29/02, H03k 5/13
[58] Field of Search........... 324/68 C; 328/129, 130, 328/63; 307/88.5 A, 88 LC, 269; 343/13 R

[56] References Cited
UNITED STATES PATENTS 2,702,367 2/1955 Ergen .................................. 324/68
2,724,553 11/1955 Faulkner .............................. 235/92
3,037,166 5/1962 Alexander ............................ 324/68

*Primary Examiner*—Maynard R. Wilbur
*Assistant Examiner*—N. Moskowitz
*Attorney, Agent, or Firm*—R. S. Sciascia; P. S. Collignon

[57] ABSTRACT

A time interval memory circuit having a pair of counters to count the oscillations from an oscillator of known frequency with bistable switching means coupled to start oscillation generation at the instant of receiving an initial pulse and to gate these oscillations in a manner that one of said counters counts only oscillations between the initial pulse and a delayed pulse following each initial pulse, such as radar transmitted and echo pulses.

7 Claims, 2 Drawing Figures

INVENTOR.
Arnold Weinstein,
BY
H. H. Losche
ATT'YS.

TIME INTERVAL MEMORY DEVICE

BACKGROUND OF THE INVENTION

This invention relates to a time interval memory circuit and more particularly to a circuit utilizing counter circuits switched by initial or synchronous reference pulses and subsequent or delayed pulses to produce a count accurately representative of the interval of time between the corresponding initial and delayed pulses, which count can be memorized.

In known devices, time intervals between two events, as between two pulses or the like, have been measured by timing circuits of capacitors and resistors having a known time constant or by an integrator circuit to produce an analog voltage representative of the time interval. Also such time intervals have been measured on the horizontal trace of a cathode ray tube by calibrated time units. In one known means one digital counter is started by a reference trigger and stopped at another subsequent event represented by a pulse delayed a time *t*. It holds this count. A second identical counter is started at the time of the subsequent synchronous pulse. At the instant, delayed time *t* after the synchronous pulse, that the second counter matches the fixed count in the first counter, an output pulse is generated. This requires a complicated digit by digit comparison of states in both counters.

SUMMARY OF THE INVENTION

In the present invention two identical binary counters, having the same number of stages to count to a limit at which time each will produce an output pulse, are coupled to count the oscillations of a pulse generator to obtain a memorized count representative of the time interval from the occurrence of an initial pulse to that of a following delayed pulse. The first counter will start counting upon the occurrence of the initial pulse and the second counter will start counting upon the occurrence of the subsequent delayed pulse and will continue counting until the first counter reaches its limit and turns off the pulse generator. Upon the occurrence of the second initial pulse, the second counter will complete its count, this completed count being the exact count representative of the time interval between the occurrence of the initial pulse and the subsequent delayed pulse since the two counters are identical. The completed count of the second counter may be stored for memory or an output pulse produced therefrom and reset for a subsequent count of the delayed time interval. It is therefore a general object of this invention to provide a binary digital counter means for exactly timing and memorizing the count representative of the time interval between first and second occurring events.

BRIEF DESCRIPTION OF THE DRAWINGS

These and other objects and the attendant advantages, features, and uses will become more apparent to those skilled in the art as a more detailed description proceeds when considered in connection with the accompanying drawing, in which.

DESCRIPTION OF THE PREFERRED EMBODIMENT

Figure 1:
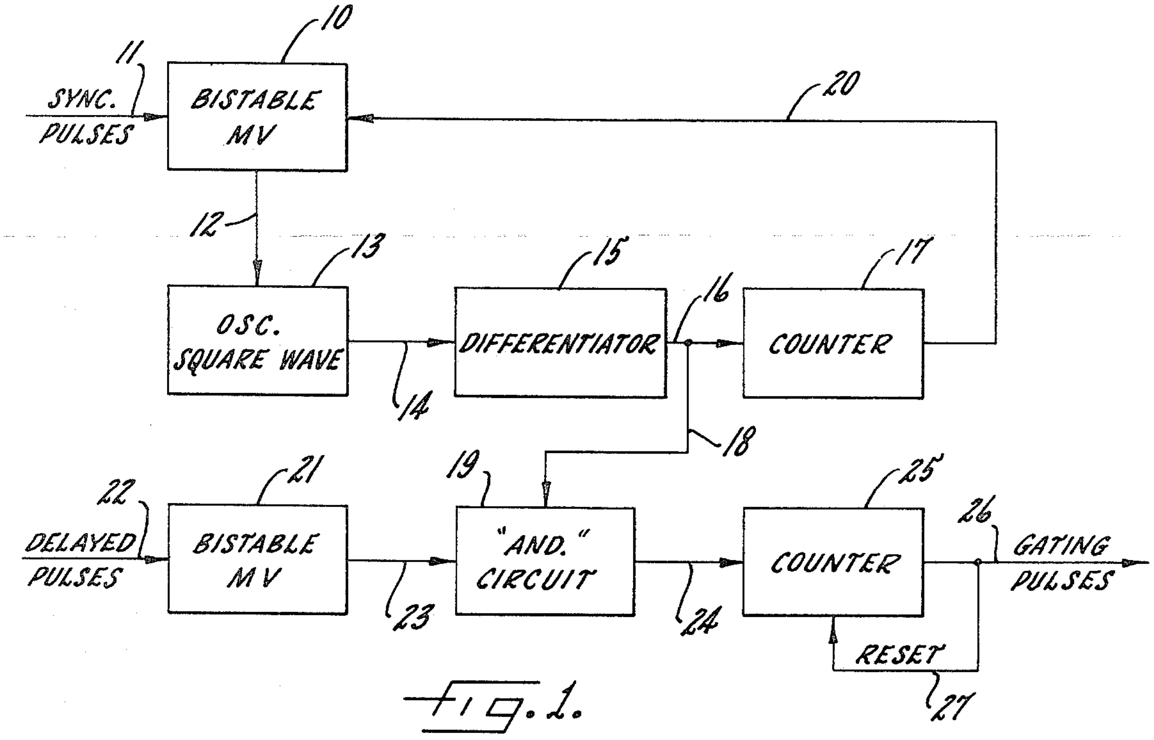
FIG. 1 is a block circuit schematic diagram of the time interval memory circuit.

Referring more particularly to FIG. 1 there is shown in block form a first bistable multivibrator 10 having as an input an initial or synchronous pulse source coupled by way of conductor means 11. The output of the bistable multivibrator is coupled by way of the conductor means 12 to a pulse generator or oscillator as shown in block form at 13 to produce square wave pulses on its output 14. The square wave oscillator output pulses on 14 are differentiated in a differentiator circuit 15 and the differentiated output on the conductor means 16 is coupled as an input to a first counter 17 and by way of a branch conductor 18 as one input to an "and" circuit 19, these circuits being shown in block form since they are of well known conventional design and construction. The output of the first counter means 17 is conducted by way of a feedback conductor 20 as a reset input to the bistable multivibrator 10. Whenever an initial input pulse is applied over the input conductor 11, bistable multivibrator 10 will be set in a state in which an output voltage on the output conductor 12 will trigger the oscillator 13 to produce square wave oscillations on 14. These square waves are differentiated in 15 and counted in the first counter means 17 until counter 17 reaches its limit at which time an output pulse over the output conductor 20 will reset bistable multivibrator 10 to cut off the oscillator 13.

A second bistable multivibrator 21 has as a triggering input over the input conductor means 22 a source of delayed pulses corresponding in frequency to the pulses applied over the input conductor 11, such as the echo pulses of a radar produced from the synchronous pulses corresponding to the initial pulses applied over the input 11. The input 22 to the bistable multivibrator 21 will change the bistable multivibrator 21, first to one of its states in which it produces a voltage output over its output conductor 23, and to its other state in which the output voltage on conductor 23 is cut off. The output of the bistable multivibrator 21 over the conductor means 23 is applied as a second input to the "and" circuit 19 such that, when a voltage output does appear on 23, the differentiated pulses from the oscillator 13 are passed through the "and" circuit 19 to the "and" circuit output 24. The output 24 of the "and" circuit 19 is coupled as an input to a second counter 25 which is identical to the first counter 17. Counters 17 and 25 are identical in that they have an equal number of stages such that each will count an equal number of pulses to arrive at a limit at which time counter 25 will produce an output pulse on its output conductor 26 in the same manner as the first counter 17 produces an output pulse on the conductor means 20. The output pulses of the counter means 25 over the conductor means 26 may be used as gating pulses for radar circuits, or the like, in which case the counter 25 could be reset by its own output over the feedback reset circuit 27 to reset counter 25 whenever it reaches its limit of count, this reset circuit 27 being shown externally of the counter for clarity although the counter will be returned to zero automatically when the limit of count is reached. The reset insures the zero state of the counter 25 at the desired time. Where it is desirable to hold the count in the binary counter 25, the reset may come from other sources or may be manually reset, as desired, in which case the counter 25 will memorize the count indefinitely.

OPERATION

Figure 2:
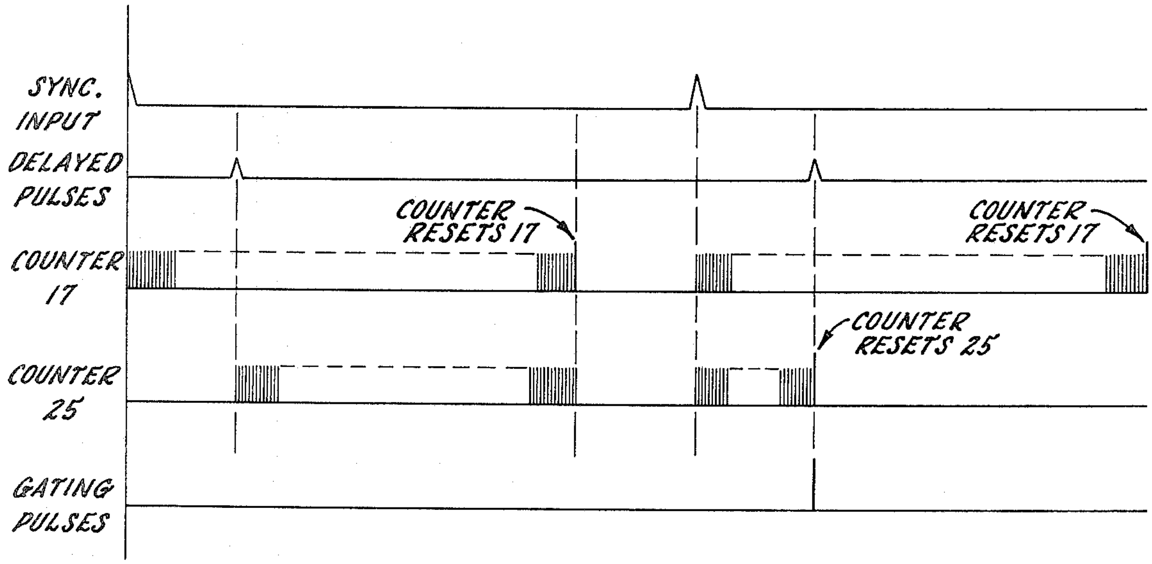
FIG. 2 illustrates in graph form the time sequence of the various input, counter, and gating pulses produced by the circuit of FIG. 1.

In the operation of the circuit of FIG. 1, reference is made to FIG. 2 to illustrate the time sequence of events to produce gating pulses on the output 26 of FIG. 1. The first initial pulse or synchronous pulse applied over conductor means 11 to the bistable multivibrator 10, as shown in the top line of FIG. 2, will start the first counter 17 to count the oscillations of the oscillator 13. For the purpose of example and not in any way limiting herein, let it be assumed that counters 17 and 25 are each designed for a full count corresponding to 1,000,000 pulses and that a 1 megacycle oscillator 13 is used. If a delayed pulse over the input conductor 22 occurs ¼ second after the first synchronous or initial pulse, as shown in line 2 from the top of FIG. 2, counter 25 will then start its count since bistable multivibrator 21 has been triggered to one of its states by the delayed pulse over 22 to condition the "and" circuit 19 to pass the differentiated oscillator pulses over conductors 16, 18, and 24 to counter 25. Assuming that the delayed pulse occurs ¼ second after the first synchronous pulse, then the first counter 17 will have counted precisely 250,000 pulses by the time that the delayed pulse appears. Since counter 17 will go to the count of 1,000,000 pulses, counter 25 will have counted 750,000 pulses when counter 17 reaches its limit to produce a pulse on its output 20 to reset bistable multivibrator 10 and cut off oscillator 13. At this point both counters 17 and 25 will cease counting. Upon the occurrence of the second synchronous or initial pulse, as shown in the top line of FIG. 2, counter 17 will again be started in its count through 1,000,000 pulses and counter 25 will complete its count of 250,000 pulses when the second delayed pulse appears at which time it will produce an output pulse or gating pulse over the output conductor 26 and at the same time reset counter 25 by the feedback reset circuit 27. Counter 25 will cease counting at this point since the second delayed pulse switches the bistable multivibrator 21 to its other state with zero voltage output on 23 to block further pulses over 18 through "and" circuit 19. When the counter 25 resets, the gating pulse will appear on the output 26, as shown in the bottom line of FIG. 2. Accordingly, every second initial or synchronous pulse will produce a gating pulse over the output conductor 26 for gating the range circuits, or the like, of a radar receiver although these output pulses may be used in many different applications where an accurate count representative of a delayed time interval is required.

It is to be understood that if the counter 25 is reset manually or by other signaling means from related radar or other circuitry, the count in this counter 25 can be stored for indefinite periods of time for later readout. It is also to be noted that the circuit of FIG. 1 does not require that the initial or synchronous pulses occur at any fixed repetition rate but that this system can operate with randomly varied repetition rates of synchronous pulses over the input conductor 11. The accuracy of delay time reproduction counted by the counter 25 is limited only by the response times and the stability of the reference oscillator 12 and the maximum frequency at which a binary switching device, such as a bistable multivibrator used at 10 and 21, can be switched from one of its states to the other.

While many modifications and changes may be made in the constructional details and features of this invention it is to be that I desire to be limited in the spirit of my invention only by the scope of the appended claims.

I claim:

1. A time interval memory circuit comprising:
first and second switchable means;
first and second identical counter means of limited count;
a pulse source coupled to said first counter means to cause said first counter means to count the pulses therefrom and coupled to be turned "on" by said first switchable means and "off" by the limited count of said first counter means;
an "and" circuit coupled to said pulse source and to said second switchable means to conduct said pulses of said pulse source when said second switchable means is in one of its switched states, said second counter being coupled to said "and" circuit to count said pulses conducted by said "and" circuit; and
initial pulse and delayed pulse inputs coupled to control the switched states of said first and second switchable means, respectively, whereby said first counter counts to its limit to cut off said pulse source and said second counter counts to its limit from the time of application of each second initial pulse and each second delayed pulse constituting the delay time memory count.

2. A time interval memory circuit comprising:
an input of initial pulses
a pulse generator and a counter coupled to said pulse generator for counting pulse generator pulses;
means coupled to said input of initial pulses and to said pulse generator, and an output of said counter coupled to said means to start said pulse generator by an initial pulse and to stop said pulse generator by an output pulse of said counter;
an input of delayed pulse signals;
switchable means coupled to said input of delayed pulses and having an output for producing alternate state signals on said output;
"and" circuit means coupled to the output of said pulse generator and to the output of said switchable means to conduct said generated pulses through to an output under one switched condition of said switchable means; and
second counter means coupled to the output of said "and" circuit to count said pulse generator pulses when said "and" circuit is conducting whereby the delay time of the delay pulse signals with respect to said initial pulses is accurately timed by count.

3. A time interval memory circuit comprising:
an input of initial pulses and an input of delayed pulses that are delayed a time interval after each corresponding initial pulse;
a first switchable means, controlled to alternate states of producing a voltage and no voltage on an output thereof, coupled to the input for controlling said first switchable means to one alternate state;
a pulse generator and a first counter in series, said pulse generator being coupled to said first switchable means output to be controlled thereby and said counter having an output coupled to said one of said switchable means to switch same to its other alternate state when said first counter arrives at a limit; a second switchable means having alternate voltage and no-voltage states produced on an output thereof; and an "and" circuit and a second counter in series, said "and" circuit being coupled to the output of said pulse generator and to the output of said second switchable means to enable same when the voltage state appears on the output of said second switchable means, and the output of said second counter being fed back to reset said second counter when the limit of count is reached whereby the second counter will count for a time period enabled by said pulse generator and "and" circuit to establish the delay between an initial pulse and its corresponding delay pulse.

4. A time interval memory circuit comprising:

first switchable means for alternately switching a voltage and non-voltage on an output thereof;

an initial pulse input coupled to said first switchable means for switching same to one state;

a second switchable means for alternately switching a voltage and no-voltage on an output thereof;

a delayed pulse input coupled to said second switchable means for alternately switching same;

a pulse generator coupled to the output of said first switchable means; and first and second counters coupled to the output of said pulse generator to count pulses thereof to a limit at which time said counters produce a signal on an output thereof, the coupling of said pulse generator and said second counter including an "and" circuit, the output of said second switchable means being coupled as the second input to said "and" circuit to pass pulse generator pulses to be counted in said second counter during the voltage output condition of said second switchable means, the output of said first counter being coupled back to said first switchable means to switch its state when said first counter reaches the limit of its count, and the output of said second counter being coupled back to reset itself upon reaching the limit of its count whereby the count of said second counter is a memorized time interval from each initial pulse to a corresponding delayed pulse.

5. A time interval memory circuit as set forth in claim 4 wherein said first and second switchable means are bistable multivibrators, the first of which causes said pulse generator to generate a pulse frequency when said bistable multivibrator is stable in its state to produce a voltage on its output, said first counter counting the pulse generator output pulses until the counter limit is reached at which time said pulse generator ceases generation, and said second counter counting to its limit from the time said pulse generator is again switched to generate pulses.

6. A time interval memory circuit comprising:

a first bistable multivibrator, each having alternate switched conditions of producing a voltage and no voltage on an output thereof;

an input of synchronous pulses coupled to said first bistable multivibrator to cause each synchronous pulse to trip said first multivibrator to its voltage output condition;

a pulse generator coupled to the output of said first bistable multivibrator to produce pulses on an output thereof when said voltage is applied thereto from said first bistable multivibrator;

a first counter circuit coupled to the output of said pulse generator and having a limit of count which produces a signal on an output thereof coupled to said first bistable multivibrator to change its state to the no voltage output thereby stopping the generation of pulses by said pulse generator;

a second bistable multivibrator having alternate switched conditions of producing a voltage and no-voltage state on an output thereof;

an input of delayed pulses, each delayed pulse being delayed with respect to a corresponding initial pulse, coupled to said second bistable multivibrator to change the states thereof on alternate delayed signals;

an "and" circuit having inputs coupled to said pulse generator output and to said second bistable multivibrator output to conduct said pulses of said pulse generator to an output thereof whenever said second bistable multivibrator is in its voltage output state; and a second counter coupled to the output of said "and" circuit having a limited count equal to that of said first counter for producing a signal on an output thereof when the limit of count is reached, said output being coupled back to said second counter to reset same whereby said first counter will count the pulses of said pulse generator to its limit of count and said second counter will count the pulses of said pulse generator beginning at the instant of delay pulse application to the time of reset by said first counter and thereafter from the instant of the next initial pulse to the limit of said second counter to establish the time interval between an initial pulse and a delay pulse.

7. A time interval memory circuit as set forth in claim 6 wherein said coupling of said first counter circuit to said pulse generator and said coupling of said "and" circuit to said pulse generator is through a differentiator circuit to shape said generated pulses into sharp peaked pulses.

* * * * *

UNITED STATES PATENT OFFICE
CERTIFICATE OF CORRECTION

Patent No. 3,801,917 Dated April 2, 1974

Inventor(s) ARNOLD WEINSTEIN

It is certified that error appears in the above-identified patent and that said Letters Patent are hereby corrected as shown below:

Column 4, Claim 3, lines 65 and 66, change:

"one of said"

To read: first

Column 6, Claim 6, line 4, delete

"each"

Signed and sealed this 10th day of September 1974.

(SEAL)
Attest:

McCOY M. GIBSON, JR.
Attesting Officer

C. MARSHALL DANN
Commissioner of Patents